(12) United States Patent
Sharma

(10) Patent No.: US 8,468,061 B2
(45) Date of Patent: *Jun. 18, 2013

(54) CRM SYSTEM FOR ENHANCED RETENTION OF CUSTOMERS

(75) Inventor: Sanjay Sharma, Shivpuri (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,466

(22) Filed: Sep. 5, 2012

(65) Prior Publication Data

US 2012/0330751 A1     Dec. 27, 2012

Related U.S. Application Data

(63) Continuation of application No. 12/422,319, filed on Apr. 13, 2009, now Pat. No. 8,285,596.

(51) Int. Cl.
*G06Q 30/00*     (2006.01)

(52) U.S. Cl.
USPC ....... 705/26.1; 705/7.11; 705/7.28; 705/7.29; 705/27.1

(58) Field of Classification Search
USPC ............... 705/26.1, 27.1, 7.11, 7.28, 7.29
See application file for complete search history.

(56) References Cited

U.S. PATENT DOCUMENTS

| | | | |
|---|---|---|---|
| 6,049,599 A * | 4/2000 | McCausland et al. | 379/111 |
| 7,801,761 B2 * | 9/2010 | Varadarajan et al. | 705/7.29 |
| 8,199,901 B2 * | 6/2012 | Rani et al. | 379/265.03 |
| 8,285,596 B2 * | 10/2012 | Sharma | 705/26.1 |
| 2003/0200135 A1 * | 10/2003 | Wright | 705/10 |
| 2004/0034558 A1 * | 2/2004 | Eskandari | 705/10 |
| 2007/0162296 A1 * | 7/2007 | Altberg et al. | 705/1 |

OTHER PUBLICATIONS

"Retain High-Value Customers," Robert Tate, located at http://www.destinationcrm.com/Articles/Web-Exclusives/Viewpoints/Retain-High-Value-Customers-47035.aspx, posted Jul. 1, 2005, accessed on Feb. 12, 2013.*

* cited by examiner

*Primary Examiner* — Jeffrey A Smith
*Assistant Examiner* — Anne Georgalas
(74) *Attorney, Agent, or Firm* — Narendra Reddy Thappeta

(57) ABSTRACT

Customer relationship management (CRM) system for enhanced retention of customers of a business entity. In one embodiment, a historical data corresponding to a customer is maintained in the CRM system, with the historical data including information on prior interactions between the customer and the business entity. On receiving a call from the customer, the historical data is identified and an attrition risk (indicating the probability of retaining the customer) is computed based on the identified data. Different offers based on the computed attrition risk are then determined and communicated to the customer during the call.

20 Claims, 9 Drawing Sheets

FIG. 5

```
611: <?xml version="1.0" encoding="UTF-8" ?>
612: <rulelist customerType="all" threshold="65">
613:   <rule id="101" description="Adjustment calls create high attrition">
614:     <conditions operator="or">
615:       <condition attribute="CallReason" operator="equals" operand="Adjustment" />
616:       <condition attribute="TotalAdjustmentCalls" operator="greaterthan" operand="0" />
617:     </conditions>
618:     <action type="increment" expression="TotalAdjustmentCalls * 10" />
619:   </rule>
620:   <rule id="102" description="Pending service requests create high attrition">
621:     <condition attribute="PendingServiceRequests" operator="greaterthan" operand="0" />
622:     <action type="increment" expression="PendingServiceRequests * 5" />
623:   </rule>
624:   <rule id="103" description="High value customers have to be retained">
625:     <condition attribute="ProductType" operator="in" operand="Silver Checking, Gold Checking" />
626:     <action type="increment%" expression="10" />
627:   </rule>
628:   <rule id="104" description="Non billing related called have low attrition">
629:     <condition attribute="CallReason" operator="notin" operand="Billing, Adjustment, FeesEnquiry" />
630:     <action type="decrement%" expression="20" />
631:   </rule>
632:   <rule id="105" description="Specific type of customers have high attrition">
633:     <conditions operator="or">
634:       <condition attribute="JobTitle" operator="in" operand="Lawyer, Counsel" />
635:       <condition attribute="JobTitle" operator="in" operand="CEO, President" />
636:       <condition attribute="JobTitle" operator="equals" operand="Senior Manager" />
637:     </conditions>
638:     <actions operator="or">
639:       <action type="increment%" expression="5" />
640:       <action type="increment%" expression="10" ifalsorule="103" />
641:     </actions>
642:   </rule>
643: </rulelist>
```

*FIG. 6A*

CRM SYSTEM FOR ENHANCED RETENTION OF CUSTOMERS

RELATED APPLICATIONS

The present application is a continuation application of, and claims priority from, co-pending U.S. Patent Application entitled, "CRM SYSTEM FOR ENHANCED RETENTION OF CUSTOMERS", application Ser. No. 12/422,319, Filed: 13 Apr. 2009, and is incorporated in its entirety herewith.

BACKGROUND

1. Technical Field

The present disclosure relates to customer relationship management (CRM) and more specifically to a CRM system for enhanced retention of customers.

2. Related Art

A Customer Relationship Management (CRM) system enables a business entity (such as a company) to manage the relationships with its customers while providing various functions such as marketing campaigns, enquiries, sales, technical support, complaints handling, billing, etc.

CRM system often track and analyze the customer specific information (generated while providing the various functions) to enable the business entity to retain (keep) the customers by providing improved services, identifying sales opportunities, executing appropriate marketing campaigns, maintaining proper customer relationships, etc.

It is often desirable that the CRM system facilitate enhanced retention of customers.

BRIEF DESCRIPTION OF THE DRAWINGS

Example embodiments of the present invention are described with reference to the accompanying drawings briefly described below.

FIG. 5 depicts the manner in which a call from a customer having a high attrition risk is handled in one embodiment.

FIG. 6A depicts a portion of rules data used in computing a value for attrition risk in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Figure 1:
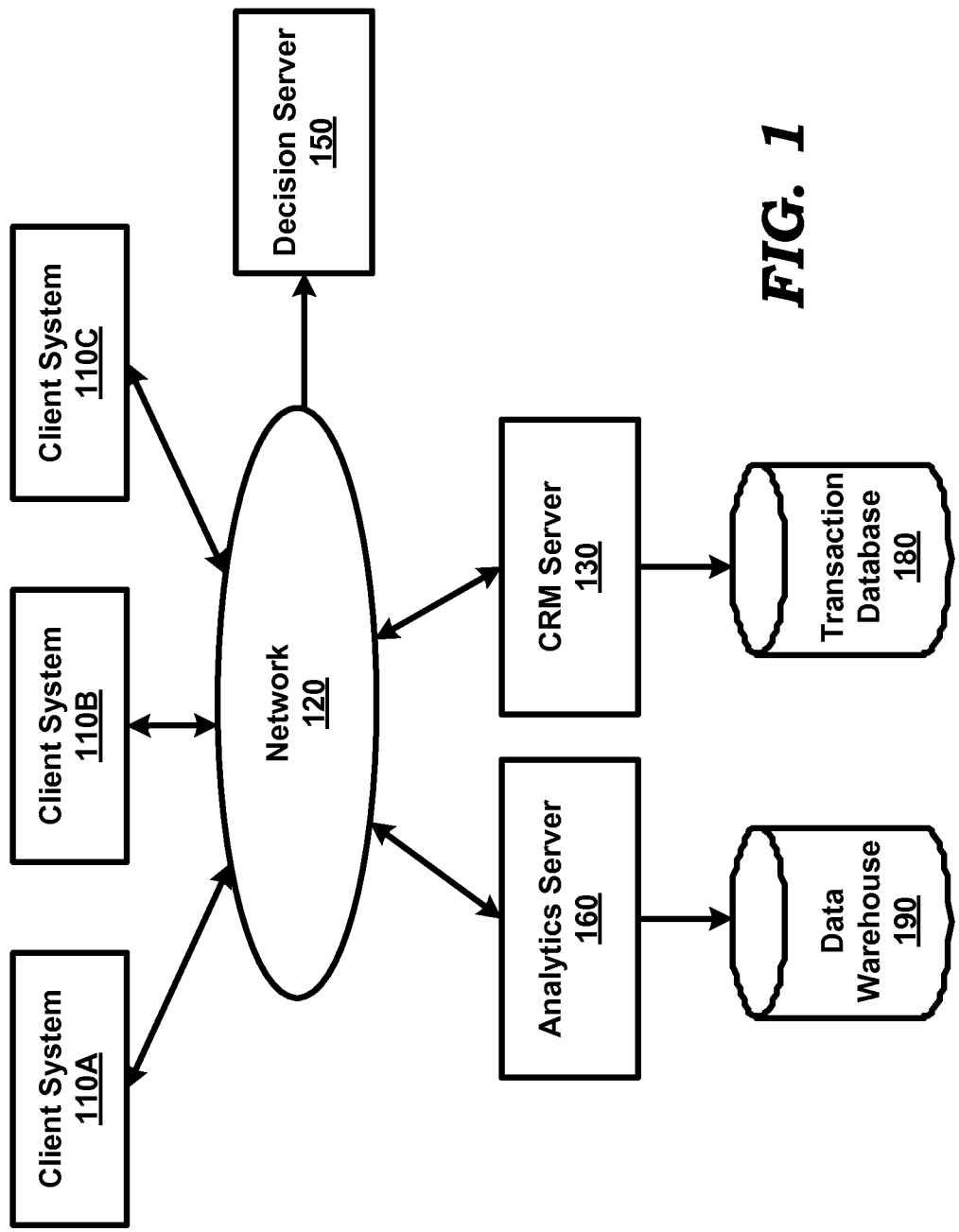
FIG. 1 is a block diagram illustrating an example environment (computing system) in which several aspects of the present invention can be implemented.

An aspect of the present invention provides a customer relationship management (CRM) system which facilitates enhanced retention of customers for a business entity. In one embodiment, a historical data corresponding to a customer is maintained in the CRM system (typically, in a data warehouse), with the historical data including information on the past interactions between the customer and the business entity.

On receiving a call from a customer, the historical data (for that customer) is identified and an attrition risk of the customer is computed based on the historical data. The attrition risk indicates the probability of retaining the customer, with a low value indicating a high probability of retention and vice versa. Different offers based on the computed attrition risk are then determined and communicated to the customer during the call.

In one embodiment, an input data is also received from the customer indicating a reason for the call, wherein the attrition risk is computed based on the historical data (indicating the past interactions of the customer stored in the data warehouse) and the indicated reason.

According to another aspect of the present invention, the (computed) value of the attrition risk is compared with a threshold value and if the computed value is greater than the threshold value, retention offers directed to increasing the probability of retaining the customer are included in the determined set of offers. Otherwise (i.e., when attrition risk is low), cross-sell offers directed to sell services desirable to the customer are included in the determined set.

In one scenario where an agent answers the call to serve the customer, the determined set of offers is first informed to the agent during the call. The agent then manually/orally informs the customer of the retention offers if the computed value of the attrition risk is greater than said threshold value (that is, attrition risk is high). Otherwise audio clips representing some of the cross-sell offers are played to the customer during the call (typically during hold period). In one embodiment, a choice data is received from the agent indicating the specific cross-sell offers to be played to the customer during the call.

According to one more aspect of the present invention, a rules data indicating the corresponding manner of computing of the attrition risk for the customers is maintained. On receiving a call from a customer, rules (contained in the rules data) applicable to the customer are determined. The attrition risk of the customer is then computed based on the historical/transaction data (of the customer) and the determined applicable rules in the rule data.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

FIG. 1 is a block diagram illustrating an example environment (computing system) in which several aspects of the present invention can be implemented. The example computing system represents a CRM system used by a business entity to manage relationship with its customers. The CRM system is shown containing client systems 110A-110C, network 120, CRM server 130, decision server 150, analytics server 160, transaction database 180, and data warehouse 190.

Merely for illustration, only representative number/type of systems is shown in the Figure. Many environments often contain many more systems, both in number and type, depending on the purpose for which the environment is designed. Each block of FIG. 1 is described below in further detail.

Network 120 provides connectivity between client systems 110A-110C, CRM server 130, decision server 150 and analytics server 160. Network 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Each of transaction database 180 and data warehouse 190 represents a non-volatile storage facilitating storage and retrieval of a collection of data by business/enterprise applications executing in one of CRM server 130 and analytics server 160.

Transaction database 180 maintains transaction data related to business transactions (for example, current marketing deals, customer call information, etc) in real time. Transaction database 180 generally enables the addition, modification, and deletion of the stored data by different users simultaneously. In contrast, data warehouse 190 stores historical data including information on the past interactions between customers and the business entity. Data warehouse 190 generally contains data extracted from different external data sources (such as transaction database 180) at pre-defined intervals, for example, at end of day, month, etc.

In one embodiment, each of transaction database 180 and data warehouse 190 is implemented using relational database technologies and therefore provides storage and retrieval of data using structured queries such as SQL (Structured Query Language). SQL refers to a special-purpose, generally non-procedural language (generally indicates what to retrieve based on conditions, in contrast to how to retrieve) that supports the definition, manipulation, and control of data in systems implementing relational database technologies.

Each of CRM server 130, decision server 150, and analytics server 160 represents a server system, such as a web/application server, executing business/enterprise applications capable of performing tasks requested from client systems 110A-110C. Each of the server systems may also contain other software programs such as operating system, device drivers, etc., (not shown) that provides a (common) run time environment facilitating the execution of multiple business/enterprise applications.

CRM server 130 executes enterprise applications (such as marketing/billing/contact applications) that are designed to provide corresponding services to the end users using client systems 110A-110C. For example, a contact application may be designed to accept requests for performing specific tasks from end users handling calls from customers of the business entity (and who are commonly referred to as "contact center agents" or just "agents"), to perform the requested tasks and to send corresponding responses containing the results of performance of the requested tasks to the requesting client system. The performance of the requested tasks by the business applications may cause addition, modification and/or deletion of the transaction data (such as the customer marketing/billing/call information) stored in transaction database 180.

Analytics server 160 executes applications designed to analyze the customer relationship data (maintained in data warehouse 190 and maybe transaction database 180) to identify commonly occurring/repeating patterns in the business transactions. The identification of the common patterns enables the business entity to decide on policies that help in managing/retaining the customers. For example, analytics server 160 may identify that the number of customer calls increases during specific periods, for example, during Christmas. Accordingly, the business entity may decide to have more agents working to receive customer calls during those periods.

Decision server 150, provided according to various aspects of the present invention, executes applications designed to calculate the attrition risk of a customer based on the historical data of the customer (stored in data warehouse 190) and also the current transaction data (stored in transaction database 180). Decision server 150 may also determine the specific offers to be communicated to the customer during a call, as described in detail below.

Each of client systems 110A-110C represents a system such as a personal computer, workstation, mobile station, etc., used by end users to generate requests to business applications executing in one of CRM server 130, decision server 150 and analytics server 160. The requests may be generated using appropriate user interfaces provided on a display unit (not shown) associated with the client system. In general, a client system requests an application for performing desired tasks and receives corresponding responses containing the results of performance of the requested tasks from the application.

For example, marketing users/agents may use one of client systems 110A-110C to send requests to a marketing application for retrieving/updating information related to the customers, such as the marketing offers of interest to different customers, the specific offers accepted by each customer, etc. Similarly, client systems 10A-110C may be used by users/administrators to retrieve/update the billing information related to each of the customers Billing information may include the current outstanding amount due from each of the customers, the corresponding credit rating, the manner of calculation of the bills, etc.

Further, client systems 110A-110C may be used by contact center agents to access various customer related information related to different customers, for example, while handling incoming product support or information inquiry calls from the customers. The customer related information (stored in transaction database 180 and/or data warehouse 190) may also be accessed to enable outgoing calls for telemarketing, sending reminders, debt collection etc.

The incoming and outgoing calls may be in the form of telephone calls, letters, faxes, e-mails, web updates, etc. or in general any form of communication as agreed between the customers and the business entity. A sample scenario illustrating the manner in which a contact center agent handles an incoming telephone call is described below with examples.

3. Example Scenario

Figure 2:
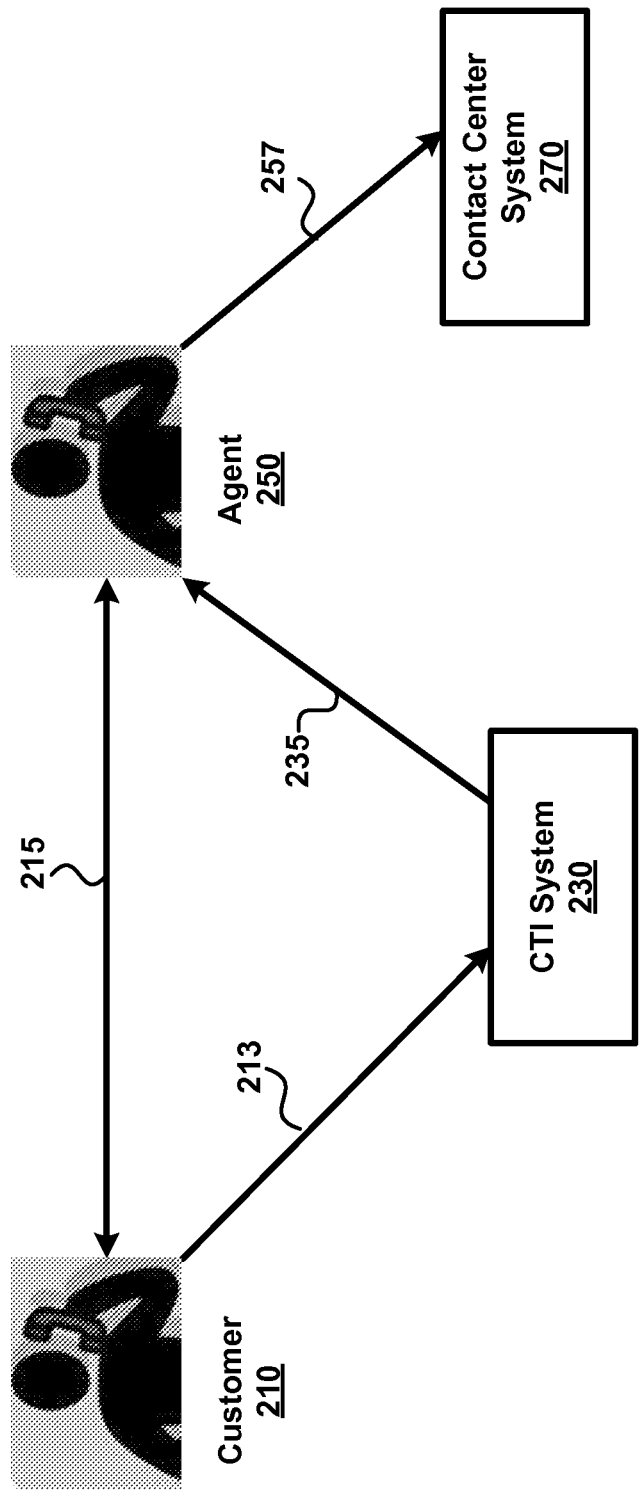
FIG. 2 is a block diagram illustrating the manner in which an incoming telephone call is handled by a contact center agent in one embodiment.

FIG. 2 is a block diagram illustrating the manner in which an incoming telephone call is handled by a contact center agent in one embodiment. The block diagram is shown containing customer 210, CTI (computer telephony integration)

system 230, agent 250 and contact center system 270. Each block of FIG. 1 is described below in further detail.

Customer 210 represents a single individual or a group of individuals who have a business relationship with a business entity/organization, or in other words, individuals who receive and/or use and/or are directly affected by the products and services of the business entity. Customer 210 may use/receive the products/services after making appropriate payments to the business entity/organization.

Customer 210 may wish to contact the business entity to receive support and/or make complaints about the products/services of the business entity. Accordingly, customer 210 may place a call (using a telephone) to a pre-specified telephone number (provided by the business entity) for initiating the contact.

CTI system 230 receives various customer calls, and distributes the calls among agents. CTI system 230 may also determine the identity of the customer in a pre-determined manner to simplify handling of the calls. For example, the identity of customer 210 may be determined based on the telephone number from which customer 210 is placing the telephone call. Alternatively, CTI system 230 may require customer 210 to specify a unique identification number (provided previously) using the telephone (and receive it via path 213). CTI system 230 then forwards the identity of customer 210 to agent 250 (via path 235).

Contact center system 270 represents client systems 110A-110C using which agent 250 may send requests to (and receive information from) various applications executing in one of CRM server 130, decision server 150, and analytics server 160. In general, the agent uses one of the client systems in the contact center system to interact with the various server systems (in particular, CRM server 130) while handling the customer calls.

Agent 250 represents an individual (working in a contact center) who is trained to handle incoming calls from various customers of the business entity using CTI system 230 and uses contact center system 270 thereafter to handle the call. Thus, agent 250 may be trained to know the various features/issues related to the different products/services offered by the business entity. As such, agent 250 may be capable of providing support to the customers and also to handle various complaints received corresponding to the different products/services.

Agent 250 may receive an indication of incoming calls from CTI system 230 (via path 235). The indication may also indicate the identity of customer 210. Agent 250 may then accept to handle the incoming telephone call and be connected to customer 210 via path 215. Agent 250 may then speak to customer 210 to determine and/or address the reason of call (for example, information required, support required, complaint to be made, etc.)

Agent 250 may also be provided convenient access to the information related to customer 210 using contact center system 270 while handling the call. Accordingly, in one embodiment, the identity of customer 210 may be sent (via path 257) in the form of corresponding requests to the server systems (130/150/160) for determining the information (stored in transaction database 180 and/or data warehouse 190) related to customer 210. The customer related information may then be displayed on a display unit (not shown) associated with contact center system 270 (or the specific client system being used). Agent 250 may then handle the telephone call with customer 210 based on the customer related information provided by the server systems.

As noted in the Background section, it is generally desirable that retention of customer 210 be enhanced. The manner in which enhanced retention of customers is facilitated according to various aspects of the present invention is described below with examples.

4. Providing Enhanced Retention of Customers

Figure 3:
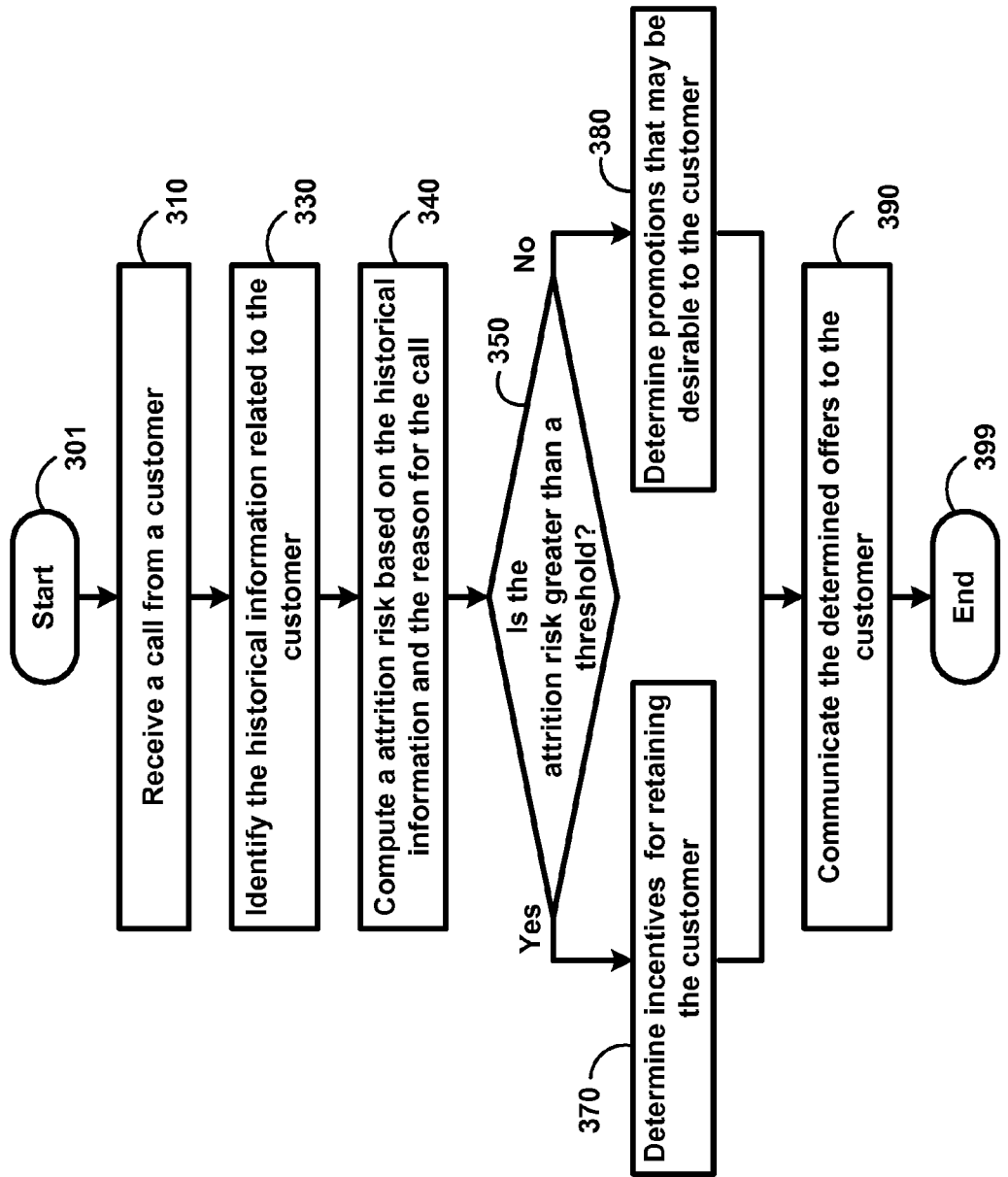
FIG. 3 is a flowchart illustrating the manner in which a CRM system facilitates enhanced retention of customers according to an aspect of the present invention.

FIG. 3 is a flowchart illustrating the manner in which a CRM system facilitates enhanced retention of customers according to an aspect of the present invention. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 310.

In step 310, a call is received from a customer. As described with respect to FIG. 2, agent 250 may receive the call via CTI system 230.

In step 330, CRM server 130 identifies the historical information related to the customer. The historical information includes information related to the various prior interactions of the customer with the business entity (including interactions with the computing systems and personnel of the business entity, e.g., email communications, money withdrawals/deposits). The customer related historical information may be identified based on the identity of the customer (as determined by CTI system 230) as described above.

In step 340, an attrition risk is computed based on the historical information and the reason for the call. The attrition risk indicates the probability of retaining the customer, with a lower attrition risk indicating a higher probability of retention and a higher attrition risk indicating a lower probability of retention.

The attrition risk may be computed by decision server 150 in response to receiving a request from contact center system 270. The received request may indicate the identity of the customer for whom the attrition risk is to be computed. Alternatively, the request may contain the historical information related to the customer based on which the attrition risk is to be computed.

It may be appreciated that the computation of the attrition risk may be computed in any desirable/convenient manner. For example, the attrition risk may be calculated based on the number of bill adjustment calls received from a customer. Bill adjustment calls may be received in a scenario that the bills sent to the customer was either inaccurately calculated or was calculated based on inaccurate information. As such, a high value of attrition risk may be attributed to (or associated with) a customer making a higher number of bill adjustment calls, thereby indicating a low probability of retaining the customer.

The reason of call may also be used for computing the attrition risk. The reason of call may be provided by customer 210 or may be determined by agent 250 based on the conversation with customer 210. In the above scenario, if a customer indicates the reason of call to be bill adjustment and if the customer already has made a large number of bill adjustment calls, a higher value of attrition risk may be associated with the customer.

In step 350, decision server 150 determines whether the computed value of the attrition risk is greater than a threshold value. The threshold value may be pre-specified by a user/administrator (of the computing system) or determined based on historical information related to attritions (by analytics server 160). Control passes to step 370 if the computed value is greater than the threshold value (indicating a high value of attrition risk, and thereby a low probability of retention) and to step 380 otherwise.

In step 370, decision server 150 determines specific incentives for retaining the customer (in the scenario that there is a low probability of retention). An incentive is a direct benefit (e.g., upgrade to higher account status, granting more frequent flier miles, offering value added services) to the customer. The specific set of incentives for retaining the customer may be determined based on the customer historical information identified in step 330. Control then passes to step 390.

In step 380, decision server 150 determines the promotions that may be desirable to the customer (in the scenario that the attrition risk is low indicating a high probability of retention). Promotions are advertisements of either the business entity for which the call is being handled, or of any other organization (typically having a tie-up with the business entity) as well. In general, an incentive is characterized by higher benefit to the customer and higher cost to the business entity compared to the corresponding parameters in relation to a promotion.

Furthermore, promotions are offered to a broader set of customers compared to the incentives, which require a customer to have attained a particular level of relationship (e.g., duration as a customer, level of usage, volume of transactions, etc,) with the business entity. In one embodiment described below, the promotions are provided in the form of pre-defined cross-sell offers (i.e., other products/services of the same business entity or any product/service of other business entities). Control then passes to step 390.

In step 390, the determined offers (incentives or promotions) are communicated to the user. The communication may entail sending the determined offers from decision server 150 to the requesting client system (in contact center system 270), and then displaying the determined offers to the contact center agent (such as agent 250) handling the call. The contact center agent then orally conveys the offers to the customer during the duration of the call.

Alternatively, the agent may be enabled to select a set of the determined offers using an appropriate user interface (e.g., using a pointer device and/or keyboard on the same client system in contact centre system). In response to the selection, audio clips corresponding to the selected set of offers may be played via the telephone to the customer (assuming that telephone system is integrated with contact centre system 270, in a known way).

In another embodiment, the determined offers may be sent in the form of an e-mail or SMS to the customer during the duration of the call. By providing the agent the ability to select the offers, suitable offers may be accurately provided to each of the customers. The flow chart ends in step 399.

Thus, by providing incentives when attrition risk is high, decision server 150 enhances the probability of retaining the customers of the business entity. Similarly, by having promotions for customers with low attrition risk, more effective use of other customer calls is also facilitated. The description is continued illustrating the manner in which calls from customers with low attrition risk are handled in one embodiment followed by the manner in which calls from customers with high attrition risk are handled.

5. Call from Customers with Low Attrition Risk

Figure 4:
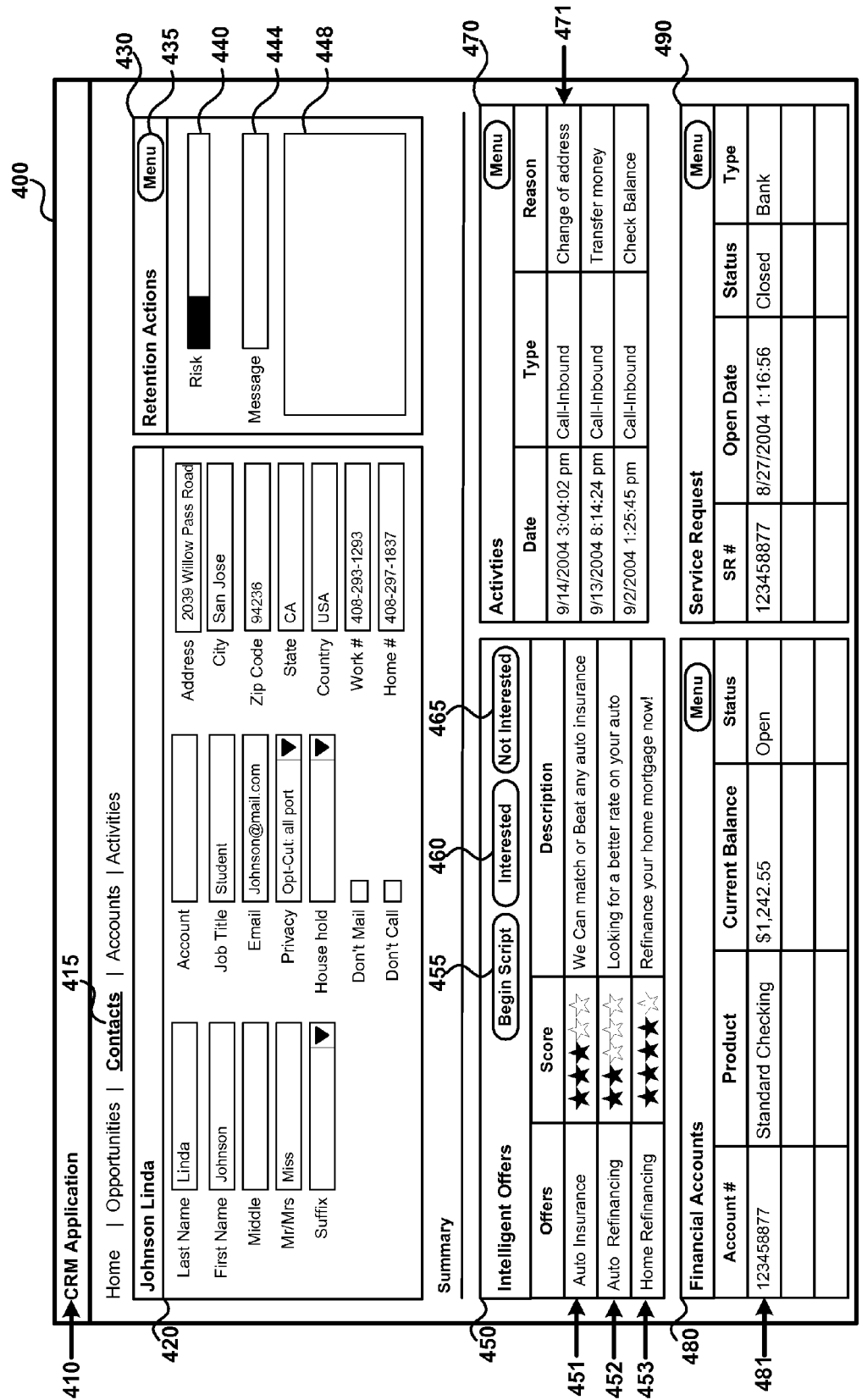
FIG. 4 depicts the manner in which a call from a customer having a low attrition risk is handled in one embodiment.

FIG. 4 depicts the manner in which calls from a customer having a low attrition risk is handled in one embodiment. Display area 400 represents a portion of a user interface displayed to agent 250 in a scenario that customer 210 is determined to have a low attrition risk.

Display area 400 (and display area 500) may be displayed on a display unit (not shown) associated with contact center system 270. Display area 400 (and 500) may be displayed by a CRM application (as indicated by text 410 and 510) executing in CRM server 130 in response to receiving the identity of a calling customer.

Text 415 indicates that the contact information related to customer 210 is being displayed in display area 420. Accordingly, display area 420 depicts the personal details of the customer such as the last name, first name, the job title, the address of the customer etc.

Display area 430 depicts the retention actions to be performed for the customer. In particular, clicking on button 435 (labeled "Menu") provides/displays a list of actions that are available for selection by agent 250. Similarly, clicking on the other buttons labeled "Menu" in display area 400 provides/displays a corresponding list of actions to agent 250.

Status bar 440 graphically depicts the attrition risk associated with the customer, with a longer colored bar indicating a higher attrition risk. It may be observed that the colored portion of status bar 440 is short indicating that the customer has a low attrition risk. Text fields 444 and 448 indicate the retention incentives to be provided to the customer in a scenario that status bar 440 indicates a high attrition risk for the customer. Text fields 444 and 448 are shown as empty since the attrition risk of the customer is low (as indicated by status bar 440).

Table 450 depicts the desirable promotions (cross-sell offers) that are to be offered to customer 210 (since attrition risk is determined to be low). Each of rows 451-453 depicts the details of a promotion/cross-sell offer that may be desirable to customer 210. In particular, row 451 specifies a promotion with name "Auto Insurance" having a brief description associated with it. Row 451 also indicates the score of the promotion to be 3 stars, the score indicating the desirability of the promotion for customer 210.

The score may be calculated based on the historical data related to the customer, in particular the prior interactions between the customer and the business entity. Thus, a larger number of stars (as shown in row 453) indicates a higher desirability, thereby indicating a higher probability of the promotion/cross-sell offer being of interest (and being accepted) by customer 210.

Agent 250 may then select one of the rows/promotions in table 450 and then click on button 455 (labeled "Begin Script") to indicate that the selected promotion is to be communicated to the customer. In response to clicking button 455, an audio clip corresponding to the selected promotion is played during the call with customer 210. Agent 250 may further select other promotions and click on button 455 to play the corresponding audio clips.

It may be appreciated that the audio clips corresponding to the selected promotions may be played during any idle (hold) time in the call, for example, when the contact center agent is updating customer related information, and is not talking to the customer. Alternatively, the audio clips may be played in response to receiving an indication of interest from the customer.

In response to listening to the audio clips, customer 210 may indicate his/her interest in the offered promotions. Agent 250 may then update the interest of the customer by clicking/selecting one of buttons 460 and 465 (respectively labeled "Interested" and "Not Interested"). The indications of interest made by the customer may be maintained in transaction database 180 (and also data warehouse 190) and used in determination of future promotions and/or incentives.

Table 470 depicts the details of the recent calls made by the customer to the business entity. In particular, row 471 specifies the details such as the date/time, the type, and the reason of the current call being made by customer 210. It may be observed that the reason of the current call is indicated to be "Change of address".

Table 480 depicts the details of the various accounts (products/services) availed by the customer from the business entity. As such, table 480 indicates that there is only one product/service (row 481) availed by customer 210. Row 481 specifies the details of the availed product/service such as the name of the product "Standard Checking", the current balance, the current status etc.

Table 490 depicts the details of the various service requests made by the customer to the business entity. Each of the rows in table 490 depicts the details of a corresponding service request such as the request identifier, the date of request ("Open Date"), the current status, and the type of request.

It may be noted that the display area 420 along with tables 470, 480, and 490 depict the historical and current information/data related to customer 210. Further, it may be observed that the historical information indicates that customer 210 is a student ("Job Title") who avails only one service (row 481), does not have any pending service requests (as indicated by the "Closed" status in table 490) and who is calling for changing his/her address (row 471). Accordingly, customer 210 is determined to have a low attrition risk.

The description is continued illustrating the manner in which calls from customers with high attrition risk are handled in one embodiment

6. Example Illustrating Customers with High Attrition Risk

Figure 5:
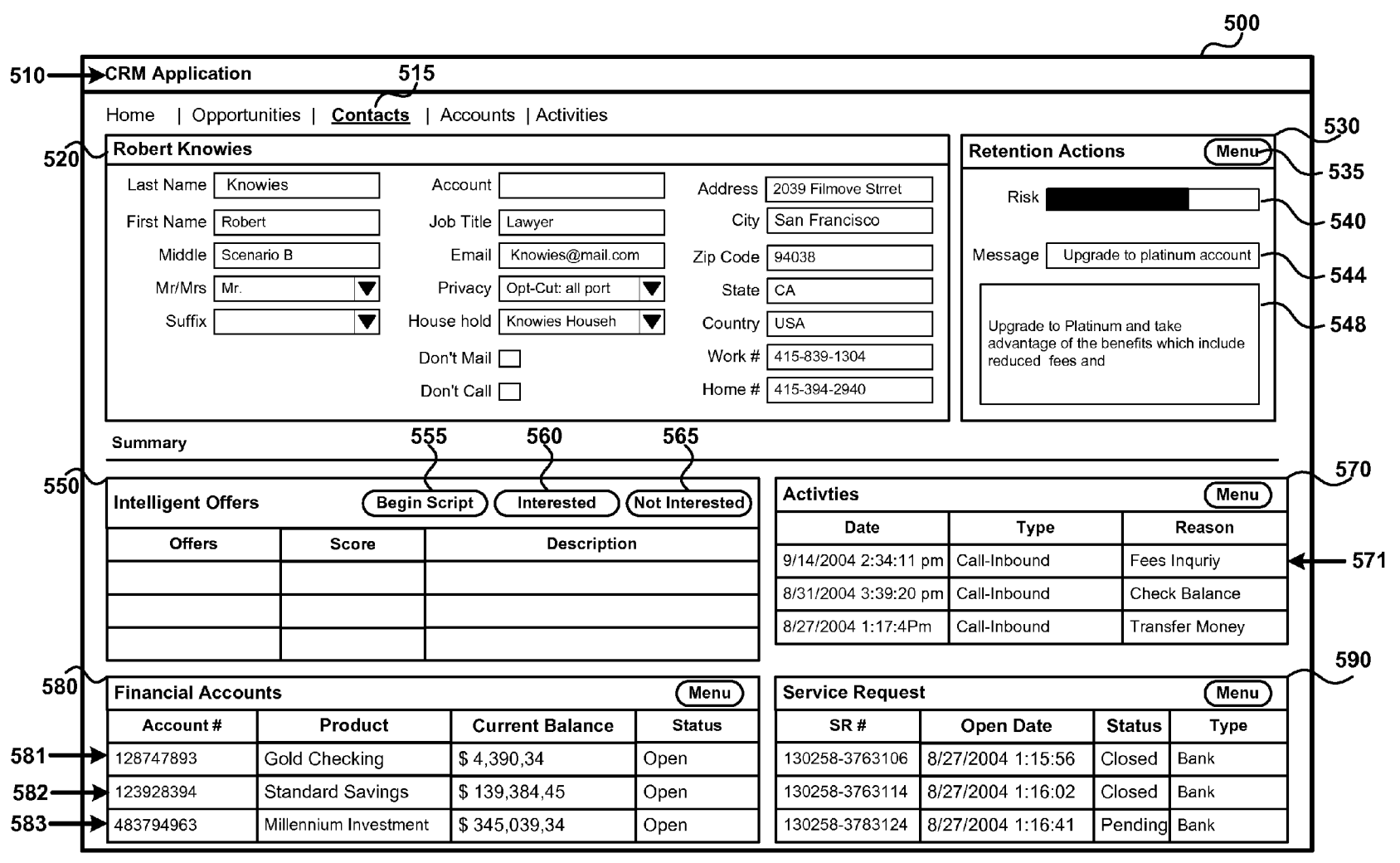

FIG. 5 depicts the manner in which a customer having a high attrition risk is handled in one embodiment. Display area 500 represents a portion of a user interface displayed to agent 250 in a scenario that customer 210 (different from the customer depicted in FIG. 4) is determined to have a high attrition risk.

Display are 500 contains portions that are functionally similar to corresponding portions of display are 400 and hence the descriptions of such portions are not repeated for conciseness. In brief, display areas 520 and 530 respectively depict the personal details of the customer and the retention actions to be performed for the customer. Tables 550, 570, 580, and 590 respectively depict the details of the desirable promotions, the recent calls, the availed products/services, and the service requests related to the customer.

It may be observed that the historical information indicates that the customer is a lawyer ("Job Title") who avails different high-end services (rows 581-583), has at least one pending service request (as indicated by the "Pending" status in table 590) and who is calling for inquiring about the fees (as indicated by "Fees Inquiry" in row 571). Accordingly, decision server 150 determines the customer to have a high attrition risk.

Since the customer has a high attrition risk, no promotions desirable to the customer are determined and as such table 550 is shown to be empty. The high value of the attrition risk is indicated by a longer colored bar in status bar 440, with the details of the incentive (retention offer) displayed in text fields 544 and 548.

Text field 544 indicates that the customer is to be provided the incentive/retention offer of upgrading his gold checking account (as indicated by row 581) to a platinum account. Text field 548 specifies a more detailed description of the incentive offer determined corresponding to the high-risk customer.

Agent 250 then orally communicates the incentive details to the customer during the current call. Agent 250 may then use the list of actions provide by clicking menu 535 to indicate the choice made by the customer, that is, whether the customer is ready to accept the incentive or not.

It should be noted that only some portions of the historical information (used in determining the attrition risk) are depicted in FIGS. 4 and 5. However, any information related to the prior interactions between the customer and the business entity may be used as the basis of calculating the attrition risk.

Further, it may be appreciated that depending on the attrition risk, incentives or promotions are offered to a calling customer. The attrition risk can be computed using various approaches, depending on the historical information maintained and the general understanding of factors seeming to affect attrition. In one embodiment, the attrition risk of a customer is computed based on rules data as described below with examples.

7. Computing Attrition Risk

FIG. 6A depicts a portion of rules data (containing rules) used in computing attrition risk for customers of a business entity in one embodiment. The rules may be specified by a user/administrator (using one of client systems 110A-110C) and may be maintained in transaction database 180 or a local database (not shown) associated with decision server 150.

Though the rules data are shown encoded in extensible markup language (XML) according to one convention, other encoding/formats and conventions may be used for representing the rules data in alternative embodiments. Further, a combination of tables defined in a database and XML data may also be used for maintaining the rules data. In general, the rules data may be maintained in any convenient format suitable for programmatic retrieval and application by decision server 150, as will be apparent to one skilled in the relevant arts by reading the disclosure provided herein.

Line 611 ("<?xml?>" tag) indicates that the following data (in lines 612-643) is specified according to XML. Lines 612-643 (element "rulelist" between the start tag "<rulelist>" in line 612 and a corresponding end tag "</rulelist>" in line 643) specify a list of rules based on which attrition risk for customers is to be computed (as a value between 0 and 100).

The value "all" for the attribute "customerType" for element "rulelist" in line 612 indicates that the list of rules are applicable for all customers of the business entity, while the value "65" for the attribute "threshold" indicates the threshold value to be used for comparing with the computed value of attrition risk when determining the offers to be provided to the customer. Thus, line 612 indicates to decision server 150 to determine retention offers/incentives if the computed value of the attrition risk is greater than "65" and cross-sell offers/promotions otherwise.

In general, each rule (element "rule") includes one or more conditions (elements "conditions" and "condition") that need to be satisfied by the historical/transactional information of a customer for the rule to be applicable for the customer. Each condition specifies an attribute of the customer to be compared, a comparison/relational operator and a comparison value (the values of the respective attributes "attribute", "operator" and "operand"). Further multiple conditions may be combined using a logical operators such as "and", "or", etc. as shown in lines 614 and 633.

Each rule also specifies the details of one or more actions (elements "actions" and "action") that are to be performed if the rule is determined to be applicable to the customer (that is, when all the conditions are determined to be satisfied). The actions specify the manner in which attrition risk is to be calculated. In particular, each action specifies the type of action to be performed in terms of whether the action increments or decrements the attrition risk (value of attribute "type") and an expression (including attributes of the customer) which on evaluation results in a value by which the attrition risk is to be incremented/decremented (value of attribute "expression").

The increment/decrement may be specified as a percentage of the current computed attrition risk as indicated by the values "increment %" and "decrement %" for the attribute "type" (for example, in lines 626 and 630). Further, for multiple actions, the rules data may indicate whether only one of the multiple actions is to be performed (value "or" for the attribute "operator" in line 638) or whether all the actions are to be performed (value "and").

Further, each of the rules is associated with a unique identifier (value of attribute "id"), with decision server 150 designed to apply the rules in the ascending/ordinal order specified by the unique identifier. Thus, the rule with identifier 101 (specified in lines 613-619) is applied before the rule with identifier "104" (specified in lines 628-631) which in turn is applied before the rule with identifier "105" (specified in lines 632-642).

Accordingly, lines 613-619 specify the details of a rule with identifier "101" (value of attribute "id" in line 613) which is to be applied only when the call reason is adjustment (condition element in line 615) or (value of attribute "operator" in line 614) when the total number of adjustment calls for the users is greater than 0 (condition element in line 616). The rule further specifies the action to be performed in line 618 which indicates that the attrition risk is to be incremented by a value equaling the total number of adjustment calls (made by the customer) multiplied by "10" ("*" being the multiplication operator, as is well known).

Similarly, the rule with identifier "102" (in lines 620-627) specifies that the attrition risk is to be incremented by the number of pending service requests multiplied by "5" when the number of pending service requests (for the customer) is greater than 0. The rule with identifier "103" (in lines 624-627) specifies that the attrition risk is to be incremented by 10% when the product/service type availed by the customer is one of "Silver Checking" and "Gold Checking" (as indicated by the "in" operator). The rule with identifier "104" (in lines 628-631) specifies that the attrition risk is to be decremented by 20% when the call reason is not one of "Billing", "Adjustment" and "FeesEnquiry" (as indicated by the "notin" operator). In other words, the attrition risk to be decremented by 20% when the reason for calling is a non-billing related.

The rule with identifier "105" (in lines 632-642) specifies that the attrition risk is to be incremented by 5% when the job title of the customer is one of "Lawyer", "Counsel", "CEO", "President" and "Senior Manager". It should be appreciated that the conditions in line 634-636 can be specified as a single condition using the "in" operator. Further, the action (in line 640) indicates that the attribute risk is to be incremented by 10% (rather than 5%) when the customer has one of the above job titles and rule 103 is applicable (that is, the customer is using one of the products/services of type "Silver Checking" or "Gold Checking").

Thus, the rules data specifies rules used in computing attrition risk for customers. Though only a few representative rules are shown as being specified in the rules data, it may be appreciated that different types/number of rules may be specified based on the desired manner of calculating attrition risk. In general, factors deemed to affect the attrition risk with a positive or negative correlation needs to be understood and then formalized as rules, thereby enabling CRM system of FIG. 1 to programmatically determine the value of attrition risk (to compare with a threshold) to the desired accuracy.

On receiving a call from a customer, decision server 150 first determines the rules that are applicable to the customer based on the historical/transaction data of the customer (retrieved respectively from data warehouse 190 and transaction database 180). The attrition risk of the customer is then computed based the historical/transaction data of the customer and the applicable rules.

Thus, when customer 210 depicted in FIG. 4 makes an incoming call, decision server 150 may first determine the rules related to the customer in response to the call. Thus, decision server 150 may determine that the rules with identifiers 101 and 104 rules are applicable since the historical data of the customer indicates bill adjustment calls (assuming to be 3 for illustration) and the reason of calling is non-billing related. Decision server 150 may then compute the attrition risk as 30 (3×10, for the bill adjustment calls) decreased by 6 (20% of 30 for non-billing reason of call) to obtain a total of 24, a low attrition value (since 24 is less than the threshold 65) which indicates a high probability of retaining the customer.

For customer 210 depicted in FIG. 5, decision server 150 may determine that the rules with identifiers 101, 102, 103, and 105 are applicable, since the historical data of the customer indicates bill adjustment calls (assuming to be 6, for convenience), pending requests (1 as shown in table 590), a gold checking account (as shown in row 581 of table 580) and a job title of "Lawyer" (as indicated in display are 520). Accordingly, the attrition risk may be calculated as 60 (6×10, as per rule 101 for the bill adjustment calls) added to 5 (1×5, as per rule 102 for pending requests) increased by 6.5 (10% of 65 as per rule 103 for "Gold Checking") and further increased by 7.15 (10% of 71.5 as per rule 105 for the combination of "Lawyer" and "Gold Checking" as specified in line 640), to obtain a total of 78.65, a high value of attrition risk (since 78.65 is greater than the threshold 65) which indicates a low probability of retaining the customer.

Thus, decision server 150 may compute the attrition risk of a customer based on the historical/transaction data of the customer and the specific rules in the rule data that are determined to be applicable for the customer. The computed attrition risk may be maintained as part of the historical data in data warehouse 190. Decision server 150 then determines cross-sell offers/promotions or retention offers/incentives based on whether the computed value of the attrition risk is below or above a threshold value (specified in rules data) as described below with examples.

8. Determining Offers

Broadly, a user/administrator creates one or more choice groups (sets of offers) and the cross-sell/retention offers included in each choice group. The offers may be created based on the requirements/goals of the business entity consistent with the policies/by-laws of the business entity as will be apparent to one skilled in the relevant arts.

Further, the user/administrator specifies the eligibility of each offer in the form of a set of rules that need to be satisfied for the corresponding offer to be eligible (available for selection) for the customer. The administrator also specifies the manner in which a score for each of the eligible offers for the customer is to be calculated, with the score indicating the desirability of the corresponding offer for the customer. The description is continued illustrating the manner in which a user/administrator creates/configures the offers in one embodiment.

Figure 6B:
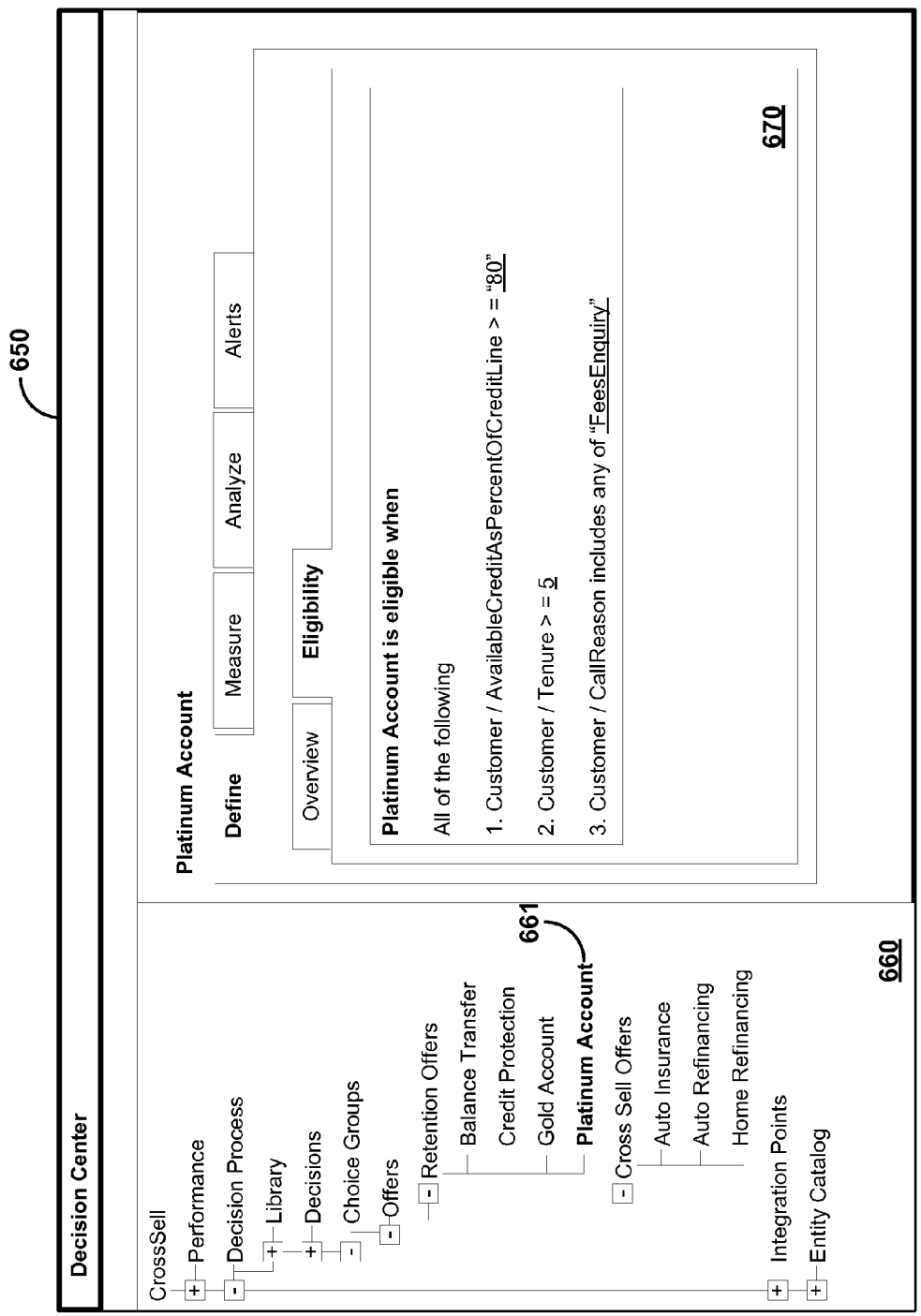
FIG. 6B depicts a user interface for specifying eligibility of offers in an embodiment.

FIG. 6B depicts a portion of a user interface which enables a user/administrator to specify eligibility of offers in one embodiment. Display area 650 represents the portion of a user interface that may be displayed on a display unit (not shown) associated with one of client systems 110A-110C used by the user/administrator. Display area 650 may be displayed by decision server 150 in response to receiving an indication from the user/administrator.

Display area 660 indicates that the user/administrator has created a choice group called "Retention Offers" containing the incentives "Balance Transfer", "Credit Protection", "Gold Account", and "Platinum Account". Display area 660 also indicates that the user/administrator has created a choice group called "Cross Sell Offers" containing the promotions "Auto Insurance", "Auto Refinancing" and "Home Refinancing".

Display area 670 enables the user/administrator to specify the eligibility of an offer (such as "Platinum Account" as indicated by 661) selected from display area 660. Display area 670 indicates that a customer is eligible for the "Platinum Account" incentive only when the customer has 80% available credit (rule 1), has been with the business entity for at least 5 years (rule 2) and the current call reason is "FeesEnquiry". Similarly, the user/administrator may specify the eligibility of each of the cross-sell offers/promotions and retention offers/incentives. The user/administrator may then specify the manner in which scores for eligible offers are to be calculated as described in detail below.

Figure 6C:
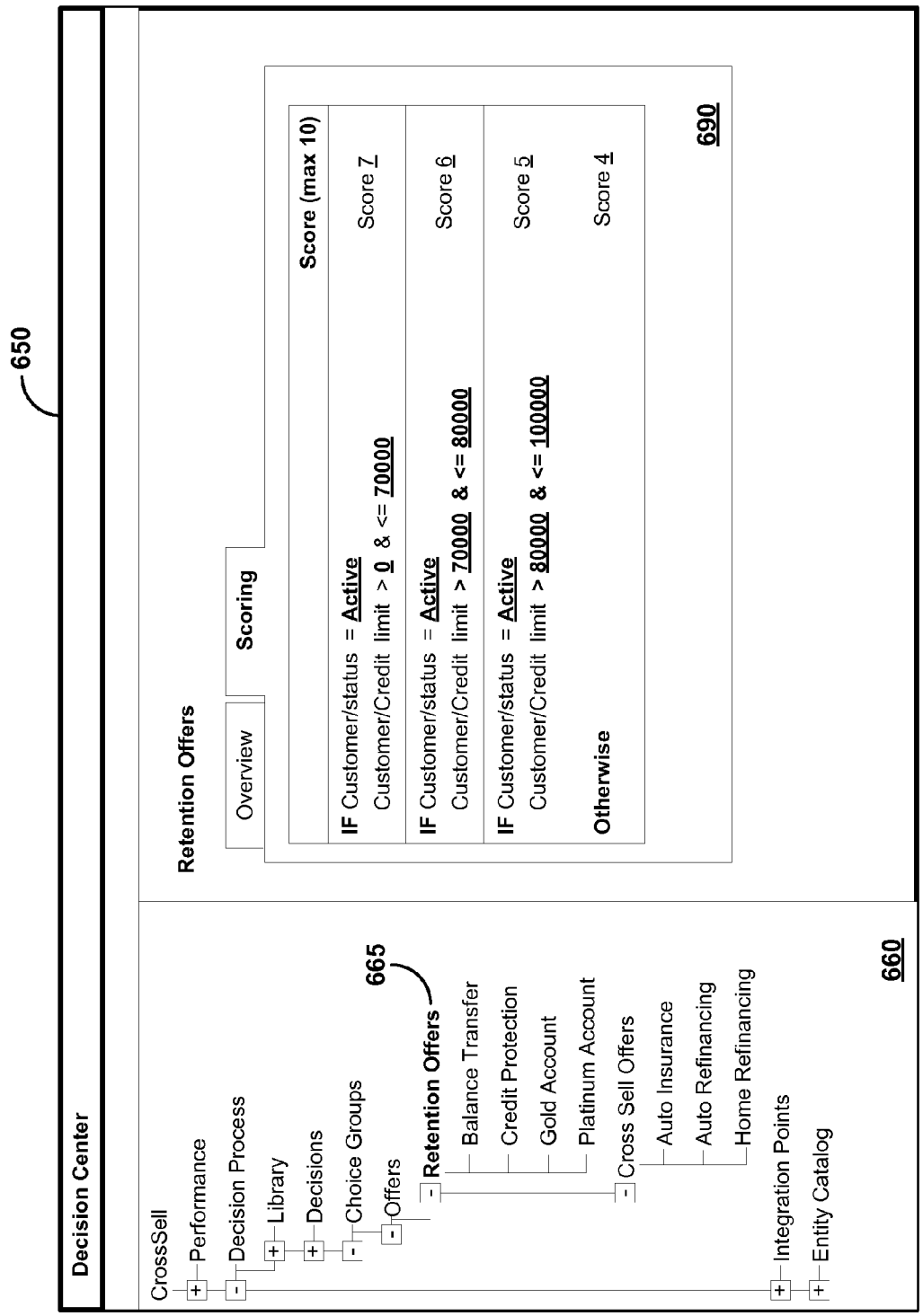
FIG. 6C depicts a user interface for specifying the manner of scoring eligible offers in an embodiment.

FIG. 6C depicts a portion of user interface which enables a user/administrator to specify the manner of calculating scores for eligibility of offers in one embodiment. Similar numbers are used to represent corresponding portions of FIGS. 6B and 6C and hence descriptions of such portions are not repeated for conciseness.

Display area 690 indicates the manner in which scores for eligible retention offers (as indicated by 665) are to be calculated. It may be observed that the score is specified as a numeric value between 0 and 10 based on corresponding conditions being satisfied by the historical/transaction data of the customer. A high score such as 7 indicates that the retention offer/incentive is highly desirable to the customer and accordingly has a high probability of acceptance by the customer, while a low score such as 4 indicates the offer is less desirable to the customer and has a low probability of acceptance by the customer.

Though the scores specified in display area 690 are based on the desirability of the offer to the customer, it may be appreciated that the user/administrator may specify scores based on other factors as well such as the expected business benefits to the customer/business entity, the expected time savings for the customer/business entity, the pride associated with having a certain offer, etc.

Thus, a user/administrator creates desired choice groups containing desired cross-sell/retention offers, specifies the eligibility of each offer and also the manner of calculating the score for each of the eligible offers. The description is continued illustrating the manner in which decision server 150 determines the offers based on the above described configuration and the computed attrition risk in one embodiment.

Decision server 150, after computing the attrition risk based on rules data, first selects the appropriate choice group based on the computed value of the attrition risk. Thus, for the customer shown in FIG. 5, decision server 150 selects the choice group "Retention Offers" since the computed value of the attrition risk is high (greater than the threshold value).

Though not shown, it may be appreciated that the user/administrator may be provided a user interface for configuring the selection of choice groups as well. For example, the user/administrator may specify a selection criteria based on which choice groups are to be considered for selection, the maximum number of choices/offers that can be selected from each choice group (for example, 1 for choice groups containing incentives/retention offers), or indicate that the selection of the choice and choice groups is to be performed at random (rather than based on the scores/selection criteria). Decision server 150 may then select the choice group based on the user specified configuration.

Decision server 150 then determines which of the offers/incentives included in the selected choice group are eligible for the customer. The determination may be performed by checking whether the rules specified as part of eligibility (as shown in FIG. 6B) are satisfied by the historical/transaction data of the customer. Accordingly, decision server 150 may determine that the customer is eligible for the "Platinum Account" incentive.

Decision server 150 then calculates a score for each of the eligible offers/incentives based on the conditions specified by the user/administrator (as shown in FIG. 6C). Assuming that the status of the customer is active and that the credit limit of the customer of FIG. 5 is 50,000, decision server 150 may calculate that the score for the "Platinum Account" incentive is "7" since the values "Active" and "50,000" satisfy the condition specified in the first row in display area 690. The score "7" for the "Platinum Account" incentive represents a high score indicating high probability of acceptance by the customer.

Decision server 150 then includes the eligible offers having high scores (such as "Platinum Account") in the determined set of offers. The determined set of offers is then displayed (either by decision server 150 or by a CRM application) to the agent on a display unit associated with contact center system 270 as shown in display area 530 of FIG. 5. The agent may then orally communicate the "Platinum Account" incentive to the customer as described above.

Similarly, for the customer shown in FIG. 4, decision serve 150 first selects the choice group "Cross Sell Offers" since the computed value of the attrition risk is low (less than the threshold value). Decision server 150 then determines the cross-sell offers/promotions eligible for the customer based on the corresponding eligibility rules. For example, decision server 150 may determine that the customer is eligible for the "Auto Insurance", "Auto Refinancing" and "Home Refinancing" promotions.

Decision server 150 calculates a score for each of the eligible offers/promotions and then only those eligible offers/promotions that have a high score in the determined set of offers. The determined set of offers is then displayed (either by decision server 150 or by a CRM application) to the agent on a display unit associated with contact center system 270 as shown in table 450 of FIG. 4. It may be observed that the calculated score corresponding to each offer/promotion is also indicated as a corresponding number of stars in the "score" column of table 450. The agent may then communicate (either orally or by playing corresponding audio clips) the promotions to the customer as described above.

Thus, decision server 150 determines the offers to be communicated to the customer based on the computed value of the attrition risk and a threshold value. It may be appreciated that in the description provided above, the offers determined for the customer are based on the score or the probability of acceptance of the offer by the customer.

However, the incentives/promotions may also be determined based either individually or a desired combination of impression commitments which specifies the minimum number of monthly impressions/communications for certain offers or offer types, the cost of presenting the offer, the cost after the offer is accepted, the predicted revenue for the company if the offer is accepted, the effect of presenting the offer on the likelihood that the customer will "tune out" of the marketing efforts (that is, likelihood of reaching the saturation point for the customer with marketing activities, also referred to as "Return on Attention"), a customer provided rank for the offers indicating the objectives of the customers, etc.

Further, business users may set priorities (or weights) for key performance indicators (KPI), thus introducing the business priorities into the process of determining the offers communicated to the customer. KPI represents financial/non-financial metrics used to help a business entity to define and evaluate its success, typically in terms of making progress towards its long-term goals.

For example, if there is a need to improve revenue even at the expense of cost, the business user can put more weight onto the revenue KPI. The second way in which business users can introduce their insight and intuition into the determination process is by utilizing a "Marketing Value" KPI. Decision server 150 may be designed to compute the marketing value for each offer based on customer profile characteristics. Decision server 150 may then combine the marketing value KPI with other KPIs in determining the final set of offers communicated to the customer. Decision server 150 may also be designed to take into account the different factors described above in determining the offers.

It should be appreciated that the features described above can be implemented in various embodiments as a desired combination of one or more of hardware, executable modules, and firmware. The description is continued with respect to an embodiment in which several features are operative when executable modules are executed.

9. Digital Processing System

Figure 7:
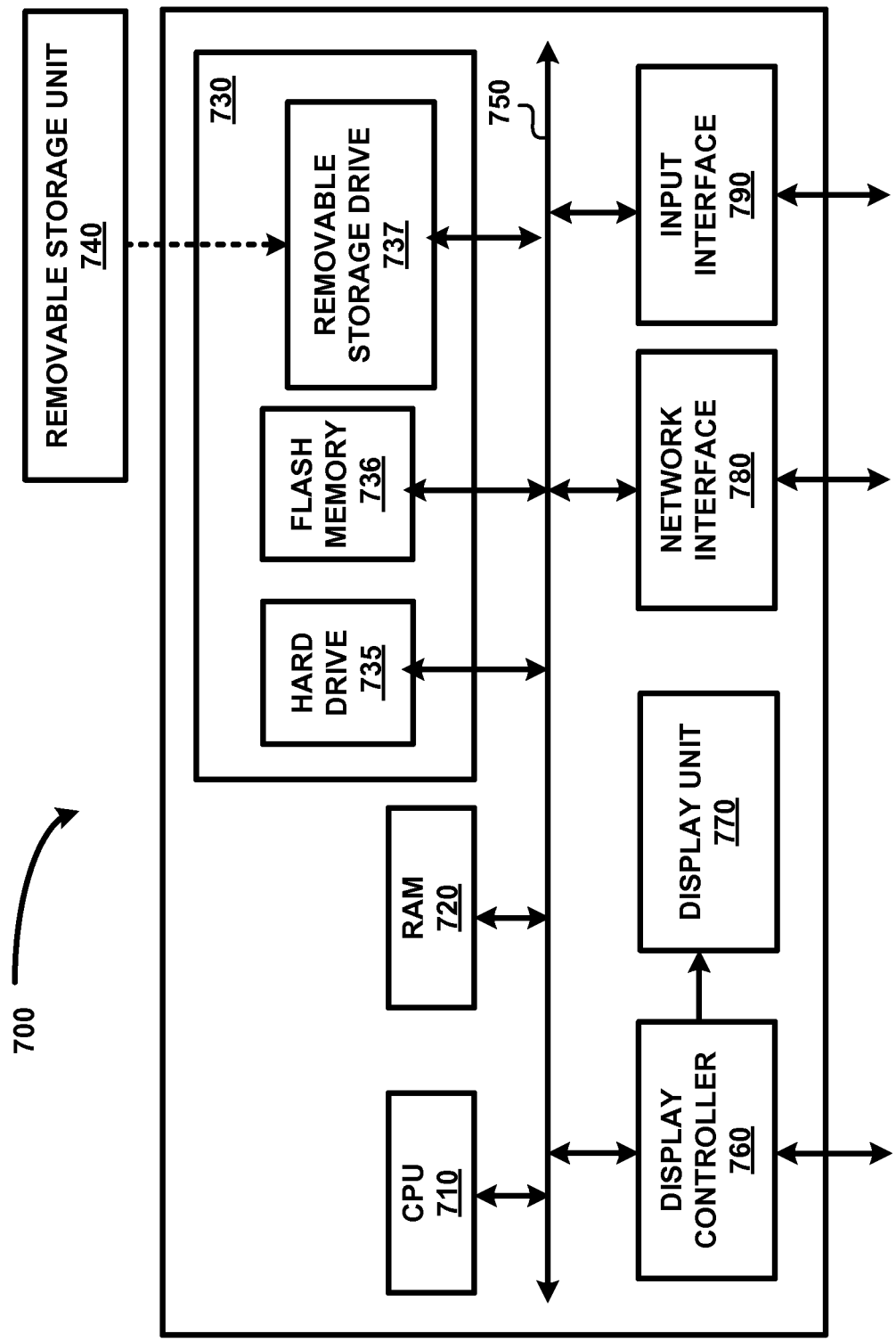
FIG. 7 is a block diagram illustrating the details of a digital processing system in which several aspects of the present invention are operative by execution of appropriate software instructions.

FIG. 7 is a block diagram illustrating the details of digital processing system 700 in which various aspects of the present invention are operative by execution of appropriate software instructions. Digital processing system 700 may correspond to decision server 150 or contact center system 270.

Digital processing system 700 may contain one or more processors (such as a central processing unit (CPU) 710), random access memory (RAM) 720, secondary memory 730, graphics controller 750, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general-purpose processing unit. RAM 720 may receive instructions from secondary memory 730 using communication path 750.

Graphics controller 750 generates display signals (e.g., in RGB format) to display unit 770 based on data/instructions received from CPU 710. Display unit 770 contains a display screen to display the images (such as the portions of the user interfaces depicted in FIGS. 4, 5, 6B and 6C) defined by the display signals. Input interface 790 may correspond to a keyboard and a pointing device (e.g., touch-pad, mouse) and may be used to provide various inputs (for example, the inputs required in FIGS. 4, 5, 6B and 6C).

Network interface 780 provides connectivity to a network (e.g., using Internet Protocol), and may be used to communicate with other connected systems (such as client systems 110A-110C, CRM server 130, decision server 150 or analytics server 160) of FIG. 1.

Secondary memory 730 may contain hard drive 735, flash memory 735, and removable storage drive 737. Secondary memory 730 may store the data (e.g., portions of the data depicted in FIG. 6A) and software instructions, which enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the following description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of enabling a business entity to enhance retention of customers using a customer relationship management (CRM) system, said method comprising:
   maintaining a historical data corresponding to a customer in said CRM system, wherein said historical data includes information on prior interactions between said customer and said business entity;
   receiving an indication that an agent answered a call received from said customer, and also data indicating a reason for said call, wherein said reason is indicated by said customer during said call and said call is a telephone call;
   identifying said historical data corresponding to said customer after receiving said call;
   computing, using said CRM system, a value representing an attrition risk of said customer based on said historical data and said data indicating reason for said call, wherein lower attrition risk indicates a correspondingly higher probability of retaining said customer and higher attrition risk indicates a correspondingly lower probability of retaining said customer;
   determining a plurality of offers based on said attrition risk, said determining comprises:
      comparing said value with a threshold value;
      if said value is greater than said threshold value, including a first set of offers directed to increasing the probability of retaining said customer in said plurality of offers; and
      otherwise, including a second set of offers directed to sell services desirable to said customer in said plurality of offers; and
   communicating at least one of said plurality of offers to said customer during said call, wherein said communicating comprises:
      if said value is greater than said threshold value, sending for display on a display unit said first set of offers during said call, wherein said agent can view and orally inform said customer of any of said first set of offers based on the displayed first set of offers;
      if said value is not greater than said threshold value, sending audio clips for playing to said customer during said call, said audio clips representing at least one of said second set of offers,
      wherein said agent is not provided the option to play audio clips representing said first set of offers such that customers with higher attrition risk are communicated orally by the agent and customers with lower attrition risk are played audio clips,
   wherein said computing, determining, and said communicating are all performed during said telephone call, wherein said CRM system comprises a digital processing system containing a processor coupled to a memory.

2. The method of claim 1, further comprising:
   maintaining rules for computing the attrition risk for each of the customers; and
   determining a set of rules corresponding to said customer in response to receiving said call, wherein said set of rules indicates the manner of computing of the attrition risk for said customer,
   wherein said computing computes said attrition risk based on said historical data according to said set of rules.

3. The method of claim 1, wherein said first set of offers comprise incentives and said second set of offers comprise promotions,
   wherein said incentives represent a direct benefit to the customer, and said promotions are advertisements,
   whereby direct benefit is provided to customers with higher attrition risk, while said advertisements are provided to customers with lower attrition risk.

4. The method of claim 3, wherein said historical data is maintained in a data warehouse comprised in said CRM system, wherein a transaction database comprised in said CRM system maintains a transaction data corresponding to the present interaction with said customer, said transaction data including said reason,
   wherein said computing computes said attrition risk based on said historical data maintained in said data warehouse and said transaction data maintained in said transaction database.

5. The method of claim 1, wherein said second set of offers are also displayed on said display unit, wherein said second set of offers are displayed associated with a choice option to select at least one offer, said method further comprising:
   receiving a choice data from said agent using said choice option, said choice data indicating a specific set of offers in said second set of offers to be played,
   wherein said playing plays audio clips corresponding to said specific set of offers to said customer during said call.

6. The method of claim 5, wherein said first set of offers are displayed without said choice option.

7. The method of claim 1, wherein said communicating comprises sending said one of said plurality of offers in the form of an e-mail or SMS to said customer during said telephone call.

8. A non-transitory machine readable medium carrying one or more sequences of instructions for causing a customer relationship management (CRM) system to enable a business entity to enhance retention of customers of said business entity, wherein execution of said one or more sequences of instructions by one or more processors contained in said CRM system causes said CRM system to perform the actions of:
   maintaining a historical data corresponding to a customer in said CRM system, wherein said historical data includes information on prior interactions between said customer and said business entity;
   receiving an indication that an agent answered a call received from said customer, and also data indicating a reason for said call, wherein said reason is indicated by said customer during said call and said call is a telephone call;
   identifying said historical data corresponding to said customer after receiving said call;
   computing, using said CRM system, a value representing an attrition risk of said customer based on said historical data and said data indicating reason for said call, wherein lower attrition risk indicates a correspondingly higher probability of retaining said customer and higher attrition risk indicates a correspondingly lower probability of retaining said customer;

determining a plurality of offers based on said attrition risk, said determining comprises:

comparing said value with a threshold value;

if said value is greater than said threshold value, including a first set of offers directed to increasing the probability of retaining said customer in said plurality of offers; and otherwise, including a second set of offers directed to sell services desirable to said customer in said plurality of offers; and communicating at least one of said plurality of offers to said customer during said call, wherein said communicating comprises:

if said value is greater than said threshold value, sending for display on a display unit said first set of offers during said call, wherein said agent can view and orally inform said customer of any of said first set of offers based on the displayed first set of offers;

if said value is not greater than said threshold value, sending audio clips for playing to said customer during said call, said audio clips representing at least one of said second set of offers, wherein said agent is not provided the option to play audio clips representing said first set of offers such that customers with higher attrition risk are communicated orally by the agent and customers with lower attrition risk are played audio clips, wherein said computing, determining, and said communicating are all performed during said telephone call, wherein said CRM system comprises a digital processing system containing a processor coupled to a memory.

9. The non-transitory machine readable medium of claim 8, further comprising one or more instructions for:

maintaining rules for computing the attrition risk for each of the customers; and determining a set of rules corresponding to said customer in response to receiving said call, wherein said set of rules indicates the manner of computing of the attrition risk for said customer, wherein said computing computes said attrition risk based on said historical data according to said set of rules.

10. The non-transitory machine readable medium of claim 9, wherein said historical data is maintained in a data warehouse comprised in said CRM system, wherein a transaction database comprised in said CRM system maintains a transaction data corresponding to the present interaction with said customer, said transaction data including said reason, wherein said computing computes said attrition risk based on said historical data maintained in said data warehouse and said transaction data maintained in said transaction database.

11. The non-transitory machine readable medium of claim 8, wherein said communicating comprises sending said one of said plurality of incentives and said plurality of promotions in the form of an e-mail or SMS to said customer during said telephone call.

12. The non-transitory machine readable medium of claim 8, wherein said first set of offers comprise incentives and said second set of offers comprise promotions, wherein said incentives represent a direct benefit to the customer, and said promotions are advertisements, whereby direct benefit is provided to customers with higher attrition risk, while said advertisements are provided to customers with lower attrition risk.

13. The non-transitory machine readable medium of claim 12, wherein said historical data is maintained in a data warehouse comprised in said CRM system, wherein a transaction database comprised in said CRM system maintains a transaction data corresponding to the present interaction with said customer, said transaction data including said reason, wherein said computing computes said attrition risk based on said historical data maintained in said data warehouse and said transaction data maintained in said transaction database.

14. The non-transitory machine readable medium of claim 13, wherein said second set of offers are also displayed on said display unit, wherein said second set of offers are displayed associated with a choice option to select at least one offer, further comprising:

receiving a choice data from said agent using said choice option, said choice data indicating a specific set of offers in said second set of offers to be played, wherein said playing plays audio clips corresponding to said specific set of offers to said customer during said call, wherein said first set of offers are displayed without said choice option.

15. A customer relationship management (CRM) system enabling a business entity to enhance retention of customers of said business entity said CRM system comprising:

a set of processors;

a set of random access memories communicatively coupled to said set of processors; and a machine readable medium, communicatively coupled to said random access memories, said machine readable medium storing one or more sequences of instructions, wherein retrieval of said one or more sequences of instructions into said random access memories and execution of said one or more sequences of instructions by said set of processors causes said CRM system to perform the actions of:

maintaining a historical data corresponding to a customer in said CRM system, wherein said historical data includes information on prior interactions between said customer and said business entity;

receiving an indication that an agent answered a call received from said customer, and also data indicating a reason for said call, wherein said reason is indicated by said customer during said call and said call is a telephone call;

identifying said historical data corresponding to said customer after receiving said call;

computing, using said CRM system, a value representing an attrition risk of said customer based on said historical data and said data indicating reason for said call, wherein lower attrition risk indicates a correspondingly higher probability of retaining said customer and higher attrition risk indicates a correspondingly lower probability of retaining said customer;

determining a plurality of offers based on said attrition risk, said determining comprises:

comparing said value with a threshold value;

if said value is greater than said threshold value, including a first set of offers directed to increasing the probability of retaining said customer in said plurality of offers; and otherwise, including a second set of offers directed to sell services desirable to said customer in said plurality of offers; and communicating at least one of said plurality of offers to said customer during said call, wherein said communicating comprises:

if said value is greater than said threshold value, sending for display on a display unit said first set of offers during said call, wherein said agent can view and orally inform said customer of any of said first set of offers based on the displayed first set of offers;

if said value is not greater than said threshold value, sending audio clips for playing to said customer during said call, said audio clips representing at least one of said second set of offers, wherein said agent is not provided the option to play audio clips representing said first set of offers such that customers with higher attrition risk are communicated orally by the agent and customers with lower attrition risk are played audio clips, wherein said computing, determining, and said communicating are all performed during said telephone call.

16. The CRM system of claim 15, wherein said machine readable medium further comprises one or more instructions for:

maintaining rules for computing the attrition risk for each of the customers; and determining a set of rules corresponding to said customer in response to receiving said call, wherein said set of rules indicates the manner of computing of the attrition risk for said customer, wherein said computing computes said attrition risk based on said historical data according to said set of rules.

17. The CRM system of claim 15, wherein said communicating comprises sending said one of said plurality of incentives and said plurality of promotions in the form of an e-mail or SMS to said customer during said telephone call.

18. The CRM system of claim 15, wherein said first set of offers comprise incentives and said second set of offers comprise promotions, wherein said incentives represent a direct benefit to the customer, and said promotions are advertisements, whereby direct benefit is provided to customers with higher attrition risk, while said advertisements are provided to customers with lower attrition risk.

19. The CRM system of claim 18, wherein said historical data is maintained in a data warehouse comprised in said CRM system, wherein a transaction database comprised in said CRM system maintains a transaction data corresponding to the present interaction with said customer, said transaction data including said reason, wherein said computing computes said attrition risk based on said historical data maintained in said data warehouse and said transaction data maintained in said transaction database.

20. The CRM system of claim 19, wherein said second set of offers are also displayed on said display unit, wherein said second set of offers are displayed associated with a choice option to select at least one offer, wherein the actions further comprise:

receiving a choice data from said agent using said choice option, said choice data indicating a specific set of offers in said second set of offers to be played, wherein said playing plays audio clips corresponding to said specific set of offers to said customer during said call, wherein said first set of offers are displayed without said choice option.

* * * * *

UNITED STATES PATENT AND TRADEMARK OFFICE
CERTIFICATE OF CORRECTION

| | |
|---|---|
| PATENT NO. | : 8,468,061 B2 |
| APPLICATION NO. | : 13/603466 |
| DATED | : June 18, 2013 |
| INVENTOR(S) | : Sharma |

It is certified that error appears in the above-identified patent and that said Letters Patent is hereby corrected as shown below:

In the Drawings

On sheet 4 of 9, in figure 4, under reference numeral 470, line 1, delete "Activties" and insert -- Activities --, therefor.

On sheet 5 of 9, in figure 5, under reference numeral 520, line 2, delete "Strret" and insert -- Street --, therefor.

On sheet 5 of 9, in figure 5, under reference numeral 570, line 1, delete "Activties" and insert -- Activities --, therefor.

On sheet 5 of 9, in figure 5, under reference numeral 571, line 1, delete "Inquriy" and insert -- Inquiry --, therefor.

Signed and Sealed this
Sixth Day of October, 2015

Michelle K. Lee
*Director of the United States Patent and Trademark Office*

CERTIFICATE OF CORRECTION (continued)
U.S. Pat. No. 8,468,061 B2

On sheet 7 of 9, in figure 6B, in Box No. 660, line 1-18, delete

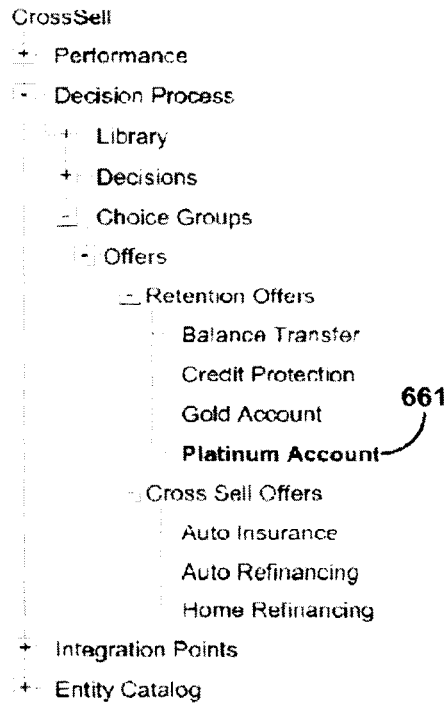 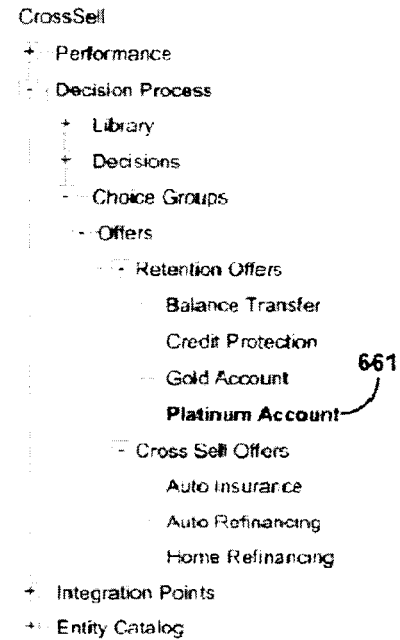

" <u>660</u> " and insert -- <u>660</u> --, therefor.

On sheet 8 of 9, figure 6C, in Box No. 660, line 1-18, delete

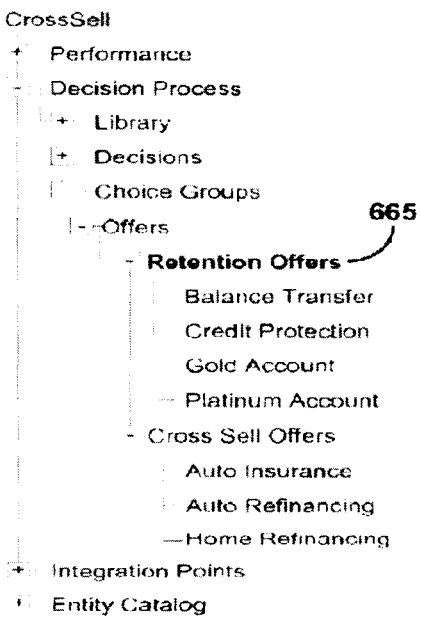 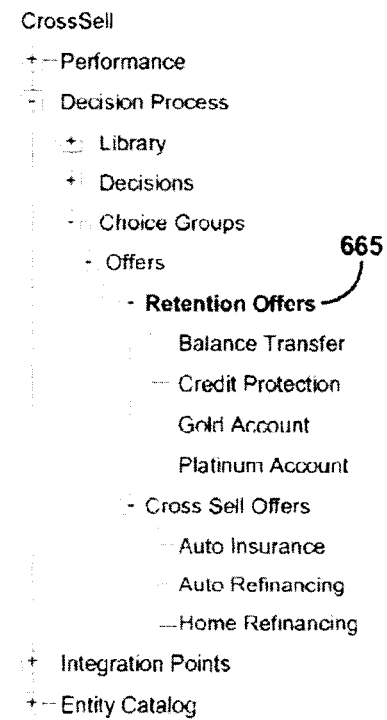

" <u>660</u> " and insert -- <u>660</u> --, therefor.

CERTIFICATE OF CORRECTION (continued)
U.S. Pat. No. 8,468,061 B2

In the Specification

In column 4, line 41, delete "10A-110C" and insert -- 110A-110C --, therefor.

In column 4, line 43, delete "customers" and insert -- customers. --, therefor.